United States Patent [19]

Brown

[11] 4,241,991

[45] Dec. 30, 1980

[54] PHOTOCOPYING MACHINE

[75] Inventor: Ian G. Brown, Milton Keynes, England

[73] Assignee: Xerox Corporation, Stamford, Conn.

[21] Appl. No.: 41,036

[22] Filed: May 21, 1979

[51] Int. Cl.³ .............................................. G03B 27/32

[52] U.S. Cl. ....................................................... 355/26

[58] Field of Search ............ 355/3 SH, 14 SH, 23-26, 355/72

[56] References Cited

U.S. PATENT DOCUMENTS

| | | | |
|---|---|---|---|
| 4,050,805 | 9/1977 | Hage | 355/14 SH |
| 4,080,060 | 3/1978 | Nothmann | 355/23 |
| 4,098,551 | 7/1978 | Komori et al. | 355/26 X |
| 4,116,558 | 9/1978 | Adamek et al. | 355/26 X |

*Primary Examiner*—Donald A. Griffin

[57] ABSTRACT

A duplex copying machine is provided with an open operator-accessible buffer storage tray and appropriate sheet feeding means to feed paper through the machine. In duplexing mode, sheet feeding takes place from the buffer storage tray instead of the main paper supply store.

1 Claim, 1 Drawing Figure

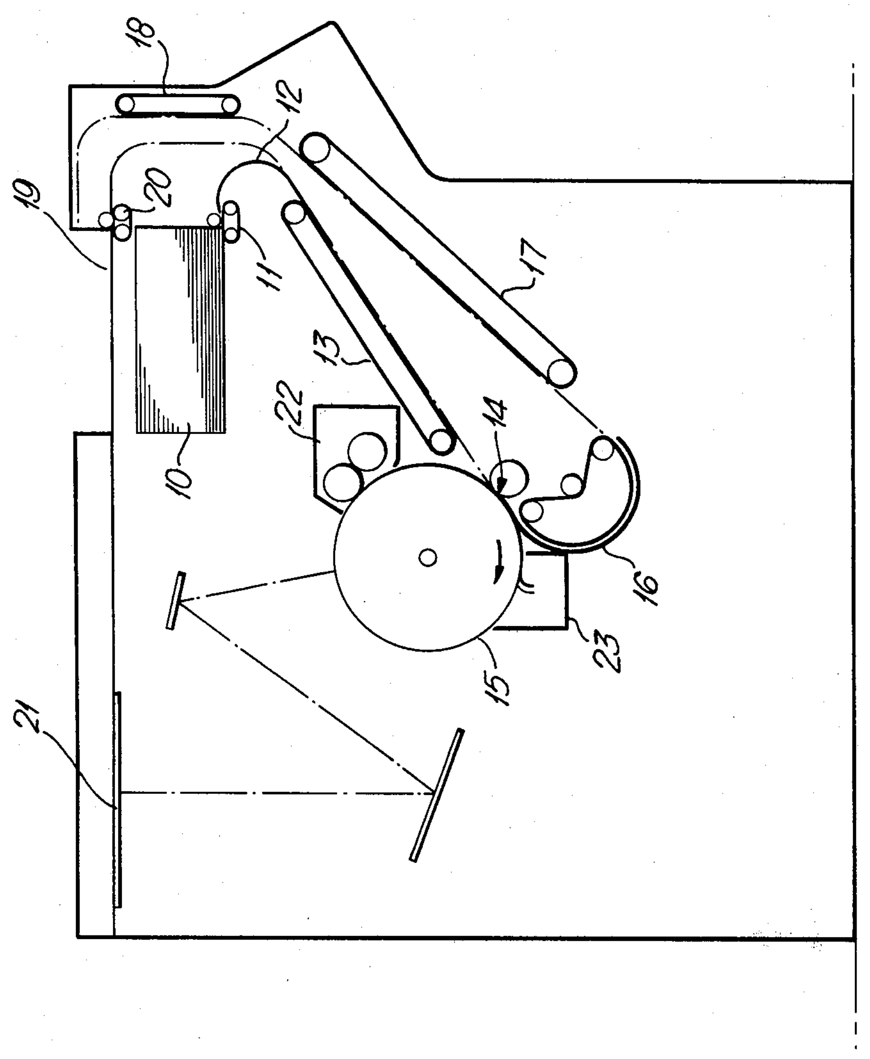
18
12
19
20
11
17
13
22
14
10
16
23
15
21

PHOTOCOPYING MACHINE

BACKGROUND OF THE INVENTION

The invention relates to photocopying machines arranged to copy onto both sides of copy material.

In forming images on both sides of a copy sheet in a photocopying machine, it is usual to pass the sheet through the machine to obtain an image on one side and then store the sheet. The stored sheet is later recycled through the photocopying machine to receive an image on its other side. In its simplest form in such a photocopying process, the sheet is returned as soon as the next image is ready, to receive its second image on its other side.

According to the present invention there is provided a photocopying machine having a transfer station where images are transferred to copy sheets and a copy sheet feeding system, said sheet feeding system comprising an open, operator accessible, buffer storage tray, sheet feeding means for feeding sheets from a sheet supply tray to the transfer station, sheet feeding means for feeding sheets from the transfer station to the buffer storage tray, and sheet feeding means for feeding sheets from the buffer storage tray to the transfer station.

DESCRIPTION OF THE INVENTION

A photocopying machine having a sheet feeding system according to the invention will now be described by way of example with the reference to the accompanying drawing which shows the machine schematically.

The sheet feeding system includes a supply tray 10 which has a bottom feeder 11 for drawing copy sheets out of the tray 10 and feeding the sheets along an arcuate guide and into contact with a belt feeder 13. The feeder 13 feeds sheets through an image transfer station 14 where an image is transferred from a photoreceptor 15 onto the copy sheet. After the transfer station 14 the sheet is driven around a 180° arcuate guide 16 and then fed by belt feeders 17 and 18 into an open buffer storage tray 19. The tray 19 is provided with a bottom feeder 20 for feeding sheets from the tray 19 into contact with the belt feeder 13.

The photocopying machine includes a platen 21 on which originals are placed for copying. An optical scanning system is provided for projecting an image of an original onto the photoreceptor 15. Developer station 22 and cleaning station 23 are provided on either side of the transfer station 14. The optical system and the developer, transfer, and cleaning stations can be any conventional type, all of which are well-known in the art of photocopying machines.

The photocopying machine can be used for simplex copying in conventional manner in which case the copy sheets are either fed out of the machine through an auxiliary discharge paper path (not shown) or collected in the tray 19 after passing once through the transfer station 14. In duplex mode, the operation of the machine is as follows:

Original documents are arranged in ascending (or descending) page order of odd numbers, for example 1,3,5, etc. and placed on the platen in that order. In the machine described, this is carried out manually by an operator. However, if there is an automatic document handler provided, the pages are arranged to be fed in the order mentioned above by the document handler. Copy sheets are fed from the supply 10 to receive images of the odd numbered sheets at the transfer station 14. After transfer, each sheet is fed into the buffer tray 19.

Even numbered pages of the original documents, arranged in ascending (or descending, respectively) page order, i.e. 2,4,6, etc. are then placed on, or supplied to, the platen 21. Copying then takes place by feeding sheets from the buffer tray 19 past the transfer station 14 and back into the tray 19. At the end of the sequence, the tray 19 has a complete and ordered duplex copy set of the original documents.

It will be noted if there is a total of originals which is an odd number, the finished set in the tray 19 will be in order except for the last page will be at the bottom of tray 19. It is possible, if desired, to arrange for this last sheet to pass around the sheet feeding system without receiving an image so as to be in its correct position in the finished set in the tray 19.

The arrangement of the tray 19 as an open tray which is readily accessible to the operator makes it a simple matter to cope with any malfunction during the duplex copying of a set. For this reason, the tray is preferably positioned as shown next to or near the platen 21 where the operator can observe and supervise the machine if necessary. It will also be noted that due to the position of tray 19 and its relationship to the sheet feeding system, as described, that the tray 19 can act as an output tray for simplex or duplex copying as well as a buffer tray.

It can be seen from the foregoing that a copying machine is provided which, due to the novel positioning and arrangement of the buffer tray 19, the bottom feeder 20, and the various sheet transports and guides, does not require a separate discharge tray thereby allowing a less expensive, more compact machine. Further, due to the location of tray 19, operator efficiency is increased, either while clearing jams, checking simplexed pages prior to the duplexing operation or in unloading the machine since the output or buffer tray 19 is adjacent the platen where the operator is normally positioned to place documents on the platen, program the machine, etc.

What is claimed is:

1. A copy machine having an original document exposure platen, a transfer station where images are transferred to copy sheets and a copy sheet feeding system, said sheet feeding system comprising:

an open, operator-accessible, combination buffer storage and a copy sheet discharge tray of unitary stationary configuration located adjacent the original document exposure platen, a copy sheet supply tray, sheet feeding means for feeding sheets from said supply tray to the transfer station, second sheet feeding means for feeding sheets from the transfer station to said combination buffer and discharge tray; and, third sheet feeding means for feeding sheets from said combination buffer and discharge tray to the transfer station.

* * * * *